United States Patent [19]

Connolly

[11] 4,286,364
[45] Sep. 1, 1981

[54] METHOD OF ORIFICE FITTING MECHANISM FOR PIPELINES

[76] Inventor: Walter L. Connolly, 133 Danefield Pl., Moraga, Calif. 94556

[21] Appl. No.: 74,239

[22] Filed: Sep. 10, 1979

Related U.S. Application Data

[62] Division of Ser. No. 923,023, Jul. 10, 1978, Pat. No. 4,191,216.

[51] Int. Cl.³ .................... F16K 27/10; B23K 31/00
[52] U.S. Cl. ........................... 29/157.1 R; 251/329; 228/182
[58] Field of Search .................. 29/157.1 R, 157 R; 251/327, 329, 326; 137/315; 138/40, 44, 45, 45 A, 94; 228/182

[56] References Cited

U.S. PATENT DOCUMENTS

| | | | |
|---|---|---|---|
| 1,996,192 | 4/1935 | Daniel | 138/44 |
| 2,034,418 | 3/1936 | Plant | 29/157.1 R |
| 2,065,628 | 12/1936 | Taylor et al. | 29/157.1 R |
| 2,217,216 | 10/1940 | Davis | 138/44 |
| 2,359,741 | 10/1944 | Venton et al. | 29/157.1 R |
| 2,448,071 | 8/1948 | Anderson | 138/44 |
| 2,664,098 | 12/1953 | McInerney | 29/157.1 R |
| 2,688,987 | 9/1954 | Whalen | 138/44 |
| 2,720,379 | 10/1955 | Williams | 251/329 |
| 2,868,495 | 1/1959 | Lucas | 29/157.1 R |
| 2,904,306 | 9/1959 | Bryant | 29/157.1 R |
| 2,964,063 | 12/1960 | Guenther | 138/94 |
| 2,982,514 | 5/1961 | Bryant | 29/157.1 R |
| 2,993,502 | 7/1961 | Van Aken et al. | 137/315 |
| 3,000,083 | 9/1961 | Bryant | 29/157.1 R |
| 3,013,770 | 12/1961 | Anderson et al. | 29/157.1 R |
| 3,123,090 | 3/1964 | Bredtschneider | 251/327 |
| 3,239,921 | 3/1966 | Grove | 29/157.1 R |
| 3,331,118 | 7/1967 | Grove | 29 157.1 R/ |
| 3,348,804 | 10/1967 | Piccardo | 137/315 |
| 3,638,908 | 2/1972 | Grove | 251/329 |
| 3,809,114 | 5/1974 | Mueller et al. | 137/315 |
| 3,905,082 | 9/1975 | Grove | 29/157.1 R |

FOREIGN PATENT DOCUMENTS

| | | | |
|---|---|---|---|
| 948658 | 8/1956 | Fed. Rep. of Germany | 251/157 |
| 423277 | 7/1947 | Italy | 29/157.1 R |

*Primary Examiner*—Daniel C. Crane
*Attorney, Agent, or Firm*—Gunn, Lee and Jackson

[57] ABSTRACT

An orifice fitting mechanism for pipeline flow measurement systems includes a fabricated body structure that is so fabricated that internal and external body plate connection welds may be effectively utilized in order that the body structure will have sufficient structural integrity to withstand the forces of high pressure service. Internal and external welding of the body plates is enhanced through the provision of internal hub rings that define portions of the internal through conduit structure of the body and also define a properly oriented transverse opening that effectively receives an orifice plate carrier assembly in sealed relation therein. The hub rings also provide for close positioning of pressure tap passages as desired for accurate flow measurement. A replaceable valve support mechanism is employed allowing the slide valve system of the orifice fitting to be field replaceable without requiring replacement of either of the upper or lower body sections.

4 Claims, 13 Drawing Figures

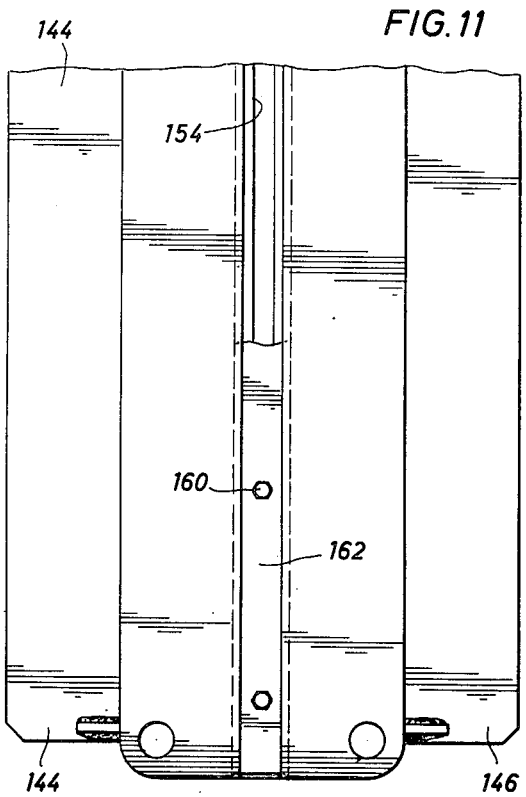
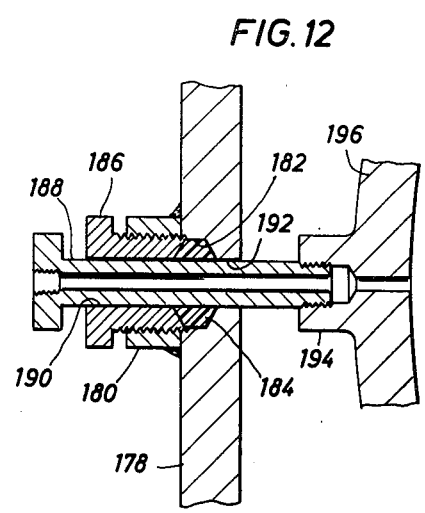
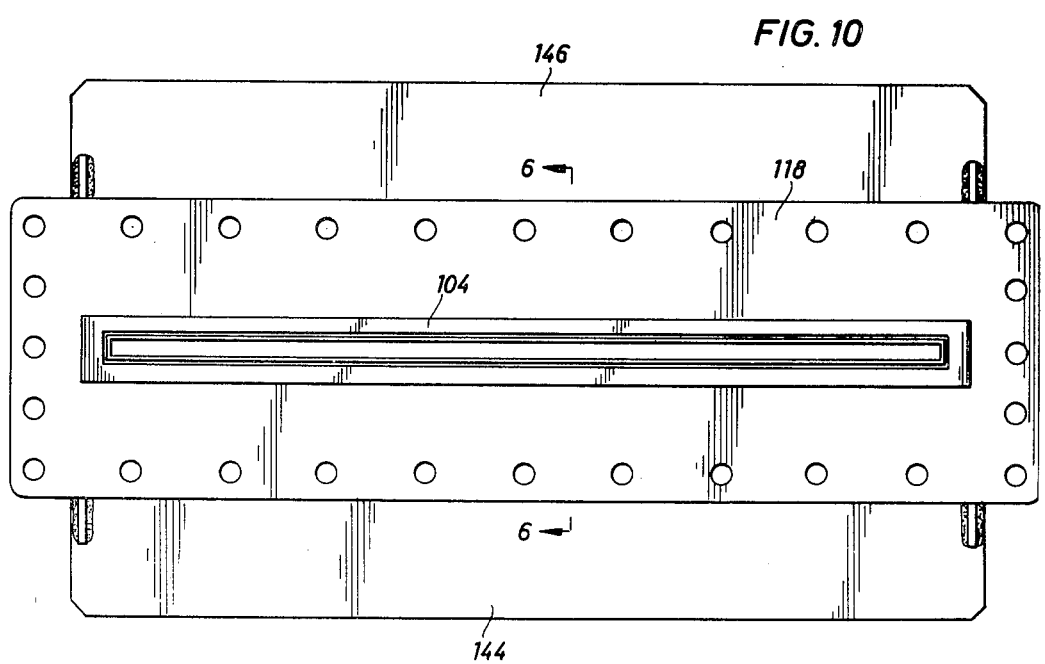

METHOD OF ORIFICE FITTING MECHANISM FOR PIPELINES

This is a division of application Ser. No. 923,023, filed July 10, 1978, now U.S. Pat. No. 4,191,216 issued Mar. 4, 1980.

FIELD OF THE INVENTION

This invention relates generally to pressure differential type flow measurement devices or flow conduits and, more particularly, relates to an orifice fitting mechanism that is connected into a flow conduit system and supports an orifice plate through which the gaseous fluid medium must flow, enabling pressure differential of the flowing fluid across the orifice to be detected. Even more particularly, the present invention relates to a fabricated orifice fitting structure that is so designed as to permit effective use in high pressure conditions and utilizes certain field replaceable components that promote effective use.

BACKGROUND OF THE INVENTION

In the handling of flowing aqueous products, such as natural gas, for example, it is necessary to accurately measure the quantity of gas that is flowing through a flow conduit system, typically referred to as a pipeline. In the natural gas industry, the gas is typically sold by quantity measurement, such as by volumetric measurement, where natural gas flows through pipelines at high velocity and under high pressure. An acceptable way to measure the flowing gas is by passing the flow stream across an orifice of predetermined size and measure the pressure differential that exists immediately upstream and downstream of the orifice. This differential pressure is utilized in conjunction with other factors, such as the pressure and temperature of the flowing gas, for purposes of calculating the volume of gas that flows through the pipeline and across the orifice. Typically, electronic means is utilized for substantially continuous detection and measurement of the flowing gaseous medium, thus providing both the seller and the purchaser with accurate data reflecting flow measurement.

The orifice is typically supported in the flow stream by means of a mechanical structure typically referred to as an orifice fitting. Orifice fittings may simply take the form of a body structure that is welded or bolted into the pipeline and which provides a receptacle for an orifice plate that defines the orifice. Because the orifice plate is subject to wear by line scale, sand and other particulate contained in the flowing gas, the orifice fitting must be provided with means facilitating removal and replacement of the orifice plate. Obviously, any wear of the orifice results in inaccurate measurement of the flowing gaseous medium and, therefore, replacement of orifice plates occurs frequently. Where the orifice fitting structure is provided with a simple bolted bonnet structure allowing insertion and removal of the orifice plate, it is, of course, necessary to discontinue flow through the pipeline and reduce line pressure to substantially atmospheric pressure in order to allow replacement of an orifice.

An orifice fitting mechanism has been developed that allows removal, replacement and reinsertion of orifice plates without necessitating reduction of line pressure and without interrupting flow. This development allows frequent inspection of the orifice plates as well as promoting orifice plate replacement without interfering with the production of the pipeline system. One such orifice fitting structure is that manufactured and sold by Daniel Industries, Inc. as the "Senior" orifice fitting which is exemplified by U.S. Pat. No. 1,996,192.

Orifice fittings that promote removability and replacement of orifice plates without intefering with line production typically incorporate a body structure including upper and lower body sections. The lower body section registers with the pipeline structure and provides adequate support for the orifice plate. A valve mechanism referred to as a valve seat and valve strip is located between the upper and lower body sections and provides a sealing mechanism. In operation, when the orifice plate is to be changed or inspected, it is raised from the lower body section through the valve seat and into the upper body section of the orifice fitting with the valve mechanism in its open position. With the valve mechanism in its open position, the upper and lower body sections will be balanced at line pressure. After the orifice plate has been raised into the upper body section, the intermediate valve mechanism will be closed, thus isolating the upper body section from the lower body section and line pressure. With the valve mechanism closed, the existing pressure in the upper body section can be vented to the atmosphere by opening a vent valve, thus reducing the upper body section to atmospheric pressure. After this has been accomplished, a clamping bar will be released at the upper extremity of the upper body section and an exit opening will be thereby defined through which the orifice plate assembly may be moved outwardly of the upper body section, thus positioning the orifice plate for ready inspection and/or removal.

The typical practice in the pipeline industry is to manufacture both the upper and lower body sections by conventional sand casting methods incorporating steel as the casting material. The steel casting method or manufacture is quite acceptable for the manufacture of smaller sized orifice fittings, but in larger sizes certain problems develop that are associated with foundry capabilities. A fundamental requirement of the body construction is that it provide a narrow air space between its two inwardly projecting circular bosses which define opposed circular sealing surfaces that establish sealing engagement with an elastomeric sealing element carried by the orifice plate assembly. The narrow air space requirement is caused by the standard practice of measurement which requires pressure tap holes on each side of the orifice plate to be quite closely located with respect to the orifice plate. In order to make this possible, the air gap between the internal circular body projections is reduced to a size range in the order of 1" to 1¼".

It is extremely difficult to cast a heavy body section in steel with an air space between the internal projections that is narrow enough so that satisfactory machining allowance can be removed from these internal projections and a cleanly machined surface be thus produced. The combination of extremely heavy metal sections and quite thin cored clearances within the casting structure develop requirements that are fundamentally incompatible. The heat present in the heavy steel sections tends to burn away the binders holding the sand grains in the cores, thus causing erosion and deterioration of the cores by the flowing molten steel. As a result, the cores break down permitting undesirable introduction of the molten steel into those portions of the internal chamber which are intended to be kept clean for passage of the orifice plate carrier therebetween. The sand that becomes eroded from the cores typically becomes incorporated into the metal of the closely spaced sections and subsequent machining of these sections will expose the sand contamination.

One solution to the casting problem that is developed by the requirement for unreasonably narrow air space between internal projections in the body concerns casting the body structure without an internal air space groove. With this form of casting, a continuous through conduit exists in the casting structure and a suitable narrow air space groove can be subsequently machined in this continuous conduit, thus developing opposed sealing surfaces that are engaged by a circular elastomeric sealing element supported by the orifice plate assembly. This practice introduces unsatisfactory complications for the foundry, however, since the cored internal chambers of the body structure which provide clearance for a plate carrier to operate so as to raise and lower the orifice plate, require proper positioning and adequate support when the cores are placed in the foundry mold. Accordingly, most foundries insist on some connection between the main conduit core and the surrounding rectangular cored sections which accommodate the carrier in the lower position.

Numerous devices are employed to mitigate the difficulties of supporting the rectangular clearance chamber cores, including external core prints, which are brought through the side walls of the rectangular chamber defined by the body structure. These core prints also serve for cleaning access for the removal of the burned core residue during the casting cleanup operation. Each such core print window must then be filled with a suitable cast steel plug which is welded into place to restore the chamber side wall to its continuous contour. All of these manufacturing operations that are performed on the body wall structure are costly and time consuming procedures which introduce undesirable long term delivery requirements from the foundry and also result in relatively high casting costs.

A second difficulty associated with the cast body structure of orifice fitting is that the machined surfaces of the through bore and the internal opposed sealing faces of the inwardly projecting hubs tend to show foundry defects, such as porous areas, cracks, shrinkage voids, etc. The tramp sand which is scoured off the walls of the casting mold by the hot molten steel is apt to be carried into sections of the casting where cleanly machined surfaces are required in the final product. For accurate flow measurement, it is necessary that the through bore of the orifice fitting have a high surface finish and that it be cylindrical within extremely close tolerances. Obviously, any surface imperfections that occur because of sand inclusions that are exposed by the machining operation requires weld repair and subsequent remachining. Such operations obviously increase the manufacturing cost of the product and, thus, detract from its competitive nature.

When casting imperfections occur in the opposed sealing faces of the internal hubs of the body structure, they are very difficult to repair because of the limited access that is provided by the narrow air space between the hub faces. Accordingly, the repair of such defects is an uncertain procedure, subject to secondary repairs when these surfaces are finished machined.

The difficulties described in connection with manufacture of the lower body section of large orifice fittings have their counterparts when considering the casting procedures employed for manufacture of the upper body sections. The upper body section is customarily produced as a steel casting that is formed with a narrow cast slot at its upper and lower extremities to permit the through passage of the orifice plate carrier structure. There is a somewhat relieved chamber in the central portion of the upper body section. In foundry practice, the necessity for providing extremely narrow upper and lower slots during the casting process results in the development of a core that is insufficiently strong to resist the combination of fluid pressures across wide spans and the burning action of the molten steel. Obviously, both of these problems tend to become worse as the size of the casting structures become larger because of the sheer volume of the molten steel that is employed for pouring the larger size castings. In practice, the foundries have insisted upon dividing the upper body section into two upper body pieces so as to reduce the unsupported span of the interior core for larger size castings. This introduces an economic penalty in the extra machine work that is required to develop a sealed connection between the two halves of the upper body section.

In typical orifice fitting structures, including a valve assembly between upper and lower body sections, it is typical for the valve assembly to be secured preferably to the upper body section by suitable means of connection. As the orifice fitting structure is placed into service and is subjected to relatively high internal pressures, pressure deflection of the upper body section is transmitted to the valve mechanism and, in some cases, interferes with the sealing ability of the valve mechanism. Even though sealant material may be injected into seal grooves to assist in the development of a positive seal, the structural distortion that may be developed due to pressure deflection of the upper body section can, in some cases, prevent the development of an efficient seal. When this occurs, it may not be possible to vent the upper body section rapidly enough to develop a high pressure differential across the valve mechanism. Typically, the sealing ability of the valve mechanism is enhanced by the pressure differential and, unless the pressure differential is sufficiently developed, the valve mechanism may not seal properly. Thus, it is important to insure that rapid upper body venting will occur.

Regardless whether the orifice fitting is of cast or fabricated construction, it is desirable to insure that a seat mounting plate be provided that is free of distortions that might occur due to the internal forces that are developed by service pressure. This is important because of the desirability that the seat structure present a true, undistorted surface for development of efficient sealing engagement with the valve strip of the orifice fitting. It is also desirable to provide a seat mounting plate structure that renders the orifice fitting structure field repairable to a large extent, especially where the orifice fitting mechanism is subjected to a highly corrosive environment, such as under service conditions where the fluid medium has a high level content of hydrogen sulfide. This type of service is typically referred to in the industry as "sour gas service" and it is well known that sour gas is extremely corrosive to metal parts that are maintained under stress. For example, hydrogen embrittlement, which is also referred to as stress corrosion, will occur quite readily when stressed metal parts are subjected to natural gas having a high hydrogen sulfide content. It is desirable to provide a seat plate structure for orifice fitting mechanisms wherein the seat plate is not only substantially free from the stresses applied to the body structure by pressure induced forces, but is also easily removed and replaced in the event of corrosion under corrosive service conditions.

In view of the foregoing, it is a primary feature of the present invention to provide a novel orifice fitting structure having upper and lower body sections of fabricated steel plate construction and which is functionally satisfactory for the service conditions that are intended.

It is also a feature of the present invention to provide a novel orifice fitting construction that establishes the capability of producing large size orifice fittings and a simple construction which can readily accommodate and wider spans required for upper body sections without necessitating division of the upper body sections into more than a single unitary structure.

It is a further feature of the present invention to provide a novel orifice fitting structure that includes a lower body section in which the wrought steel plate employed includes a sound weldment which can be machined simply with a certainty of clean sound metal surfaces for the critical sealing areas and for the critical through conduit bore.

Another feature of the present invention contemplates the provision of a novel orifice fitting structure that provides for the use of lower cost construction material and the use of steel plates to develop body sections for orifice fittings that effectively replace the more expensive steel castings that are ordinarily utilized.

It is another feature of the present invention to provide a novel orifice fitting structure that provides the manufacturing facility with the capability of prompt delivery of large size products that are typically made to special order of the customers and, thus, promoting competitive advantage over the manufacturers of similar products where extremely long delivery time is necessitated by the number and difficulty of the various manufacturing processes for such products.

It is an even further feature of the present invention to provide a novel orifice fitting structure that effectively provides for the introduction of the manufacturing process to other countries where foundry capacity is limited and similarly to provide for effective low cost manufacture under circumstances where relatively small quantities of large size products are typically ordered by customers.

It is also a feature of the present invention to provide a novel fabricated orifice fitting structure where products may be effectively manufactured and sold under profitable conditions even when order quantities are sufficiently low that the purchase of patterns and the attendant cost of developing satisfactory foundry practices, such as heading, gating, etc., is uneconomic.

Another feature of the present invention is a novel orifice fitting structure incorporating an intermediate "seat mounting plate" between upper and lower body sections which serves as a stable mounting surface for the valve seat and maintains the seat mounting plate free of distortions that are typically associated with the lower face of the upper body section due to the forces developed by service pressure.

It is also a feature of this invention to provide a novel orifice fitting structure incorporating a seat mounting plate structure which permits the field replacement of a valve seat without regard to deterioration which may have occurred on the upper body section during its service life and without regard to replacement of either of the upper or lower body sections.

Another important feature of the present invention concerns the provision of a novel method of manufacturing fabricated orifice fitting structures whereby all body structures include both interior and exterior welds for the purpose of facilitating the structural integrity that is necessary for high pressure service conditions.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

According to the present invention, a fabricated orifice fitting structure is provided having fabricated upper and lower body sections. In each case, the connection between the various plate structures defining the body sections incorporate inside and outside welds to provide body sections of sufficient structural integrity to withstand the forces developed under high pressure conditions. The lower body section of the orifice fitting structure is in the form of a generally rectangular box structure having a pair of parallel end plates defining circular openings that correspond to the size of the flow passage extending through the orifice fitting structure. To the end plates are connected a pair of side plates that cooperate with the end plates to define a generally rectangular body structure. The basic rectangular portion of the body structure is completed by providing top and bottom plates that are welded both internally and externally to other plate components of the body structure.

The narrow internal air gap or passage within the body structure that facilitates positioning of the orifice carrier assembly is defined by a pair of hub rings that are welded to respective ones of the end plates by means of large annular welds thereby forming the hub rings into annular opposed hubs defining opposed sealing surfaces for engagement by the elastomeric seal member of the orifice plate carrier structure. In the process of manufacture, the hub rings can be very accurately positioned relative to one another prior to welding thereby permitting properly spaced machined sealing surfaces to be developed with very light machining cuts. By employing light machining cuts, very little machine tool distortion will occur and the resulting sealing surfaces will be quite true. Moreover, accurate spacing of the machined sealing surfaces may be quite simply and efficiently maintained by way of the hub ring construction.

Each of the hub rings is formed to define an external boss that engages or is positioned in juxtaposed relation to one of the side plates of the lower body structure in registry with respective ones of openings defined in the side plates. Welded connection between the side plate and the respective bosses of the hub rings may be developed by simply filling the side plate openings with weld metal after a welded connection has been established between the boss structure and the plate metal at the inside portion of the side plate. Pressure tap passages are formed through the side plate and through each of the bosses of the hub rings thereby positioning the internal pressure tap openings quite close to the center line of the orifice plate. The boss members in effect provide an internal structural bridge through which the pressure tap passages extend to provide sealed pressure tap passages.

At the upper portion of the lower body section is provided a valve carrier guide structure that provides guiding support for an elongated valve carrier that is capable of being shifted between open and closed positions by a pinion gear that engages a rack structure formed on the valve carrier. A valve strip is received within an elongated recess formed in the valve carrier and provides an upper sealing surface that is adapted to engage the lower sealing surface of a valve seat structure that extends slightly into the lower body section.

In one form of the invention, the valve seat structure is supported by, or formed integrally with, an intermediate seat mounting plate that is sandwiched between the lower flange of the upper body section and the upper flange of the lower body section. The seat mounting plate, not being structurally interconnected to the flanges of either of the upper or lower body sections, may be maintained quite true and thereby provide efficient support that maintains the valve seat quite true for effective sealing engagement with the valve strip.

In another form of the invention, the valve seat structure may simply be bolted or otherwise affixed to the lower flange structure of the upper body section so as to extend slightly into the lower body section upon assembly for sealing engagement with the valve strip.

A rack and pinion mechanism is also provided in the body structure for raising and lowering the orifice carrier mechanism.

In accordance with the method of manufacture, a generally rectangular body tube is formed by internal and external welds between the side plates and end plates of the body structure. After this has been done, the bottom plate and the upper flange plate are connected to the body tube structure by means of internal and external welds. The hub rings are then positioned within the body structure with the internal surfaces of the rings in registry with the flow passage openings defined within the end plates. The opposed end surfaces of the hub rings are accurately positioned in parallel relation with one another and are properly spaced so that accurate sealing surface development can be accomplished by means of light machining cuts on the end surfaces of each of the hub rings. Thus properly positioned, the hub rings are then welded to the internal portions of the end plates, thus defining internal hubs with opposed sealing surfaces defined at the extremities thereof. The bridge connection between the bosses of the hub rings and the side plates may then be established by welding from the inside out so as to completely fill the openings exposing the hub ring bosses. After this has been accomplished, the inlet and outlet conduit sections may be welded to the outer portions of the side plates by means of internal and external welds. The conduit sections then may be prepared with desirable connection preparation, such as by welding flanges at the extremities thereof by means of internal and external welds or by preparing the end portions of the conduit sections for weld connection to a pipeline system.

The upper body section of the orifice fitting structure takes the form of a generally rectangular tube defined by a pair of parallel end plates to which are welded parallel side plates by means of internal and external welds. When required by the size and pressure class, the structural integrity of the body tube is enhanced by means of one or more transverse ribs that extend across the end plates and are welded to the end plates by means of intermediate upper and lower welds that are centrally located relative to the ribs and end plates but terminate short of the extremities of the ribs. A pair of tie plates extend across the side plates with the extremities of the tie plates being welded to the extremities of the ribs. A bottom flange is connected to the end and side plates defining the tube structure by means of internal and external welds and is either prepared for sandwiched engagement with a seat carrier plate or is formed to support a valve seat as discussed above. The upper end of the upper valve body section is closed by means of an upper closure plate defining a narrow slot through which the orifice carrier passes when entering or exiting the valve body structure. The upper plate also is formed to receive a sealing assembly to provide a fluid tight seal when the upper body section is exposed to line pressure.

BRIEF DESCRIPTION OF THE DRAWINGS

So that the manner in which the above recited features, advantages and objects of the present invention, as well as others which will become apparent, are attained and understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

IN THE DRAWINGS

Figure 1:
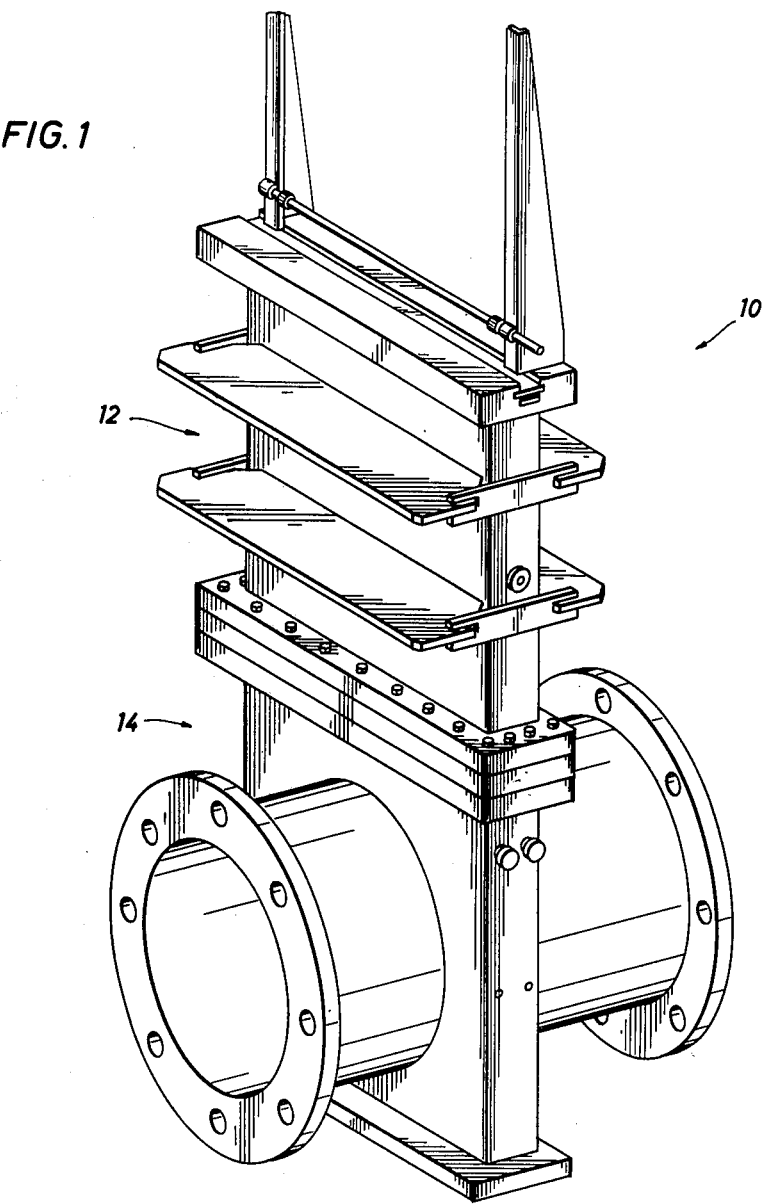

FIG. 1 is an isometric view of a fabricated orifice fitting structure that is constructed in accordance with the present invention.

Figure 2:
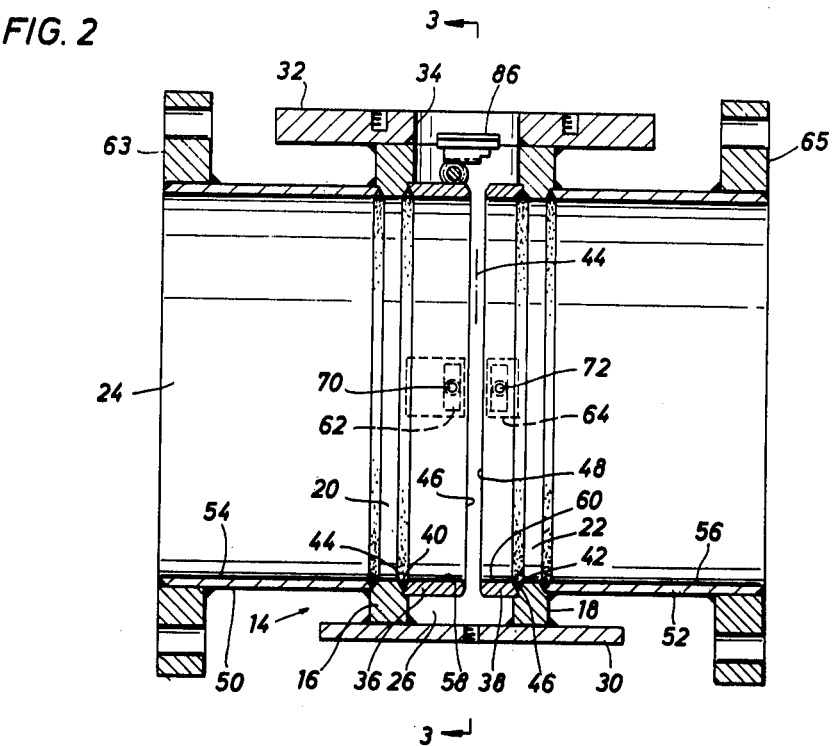

FIG. 2 is a sectional elevation view of the lower body section illustrating the weld connection between the various structural components and showing the hub rings and valve carrier mechanism in detail.

Figure 3:
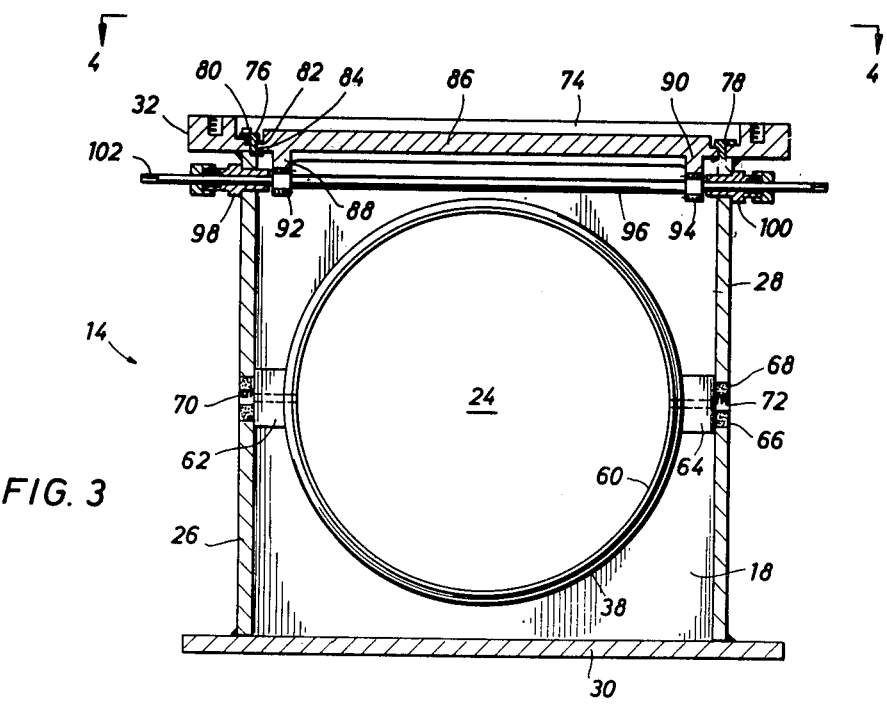

FIG. 3 is a sectional view taken along lines 3—3 of FIG. 2 and showing the hub rings and the welded connection thereof to the side plates of the lower body section and further illustrating the valve carrier mechanism in detail.

Figure 4:
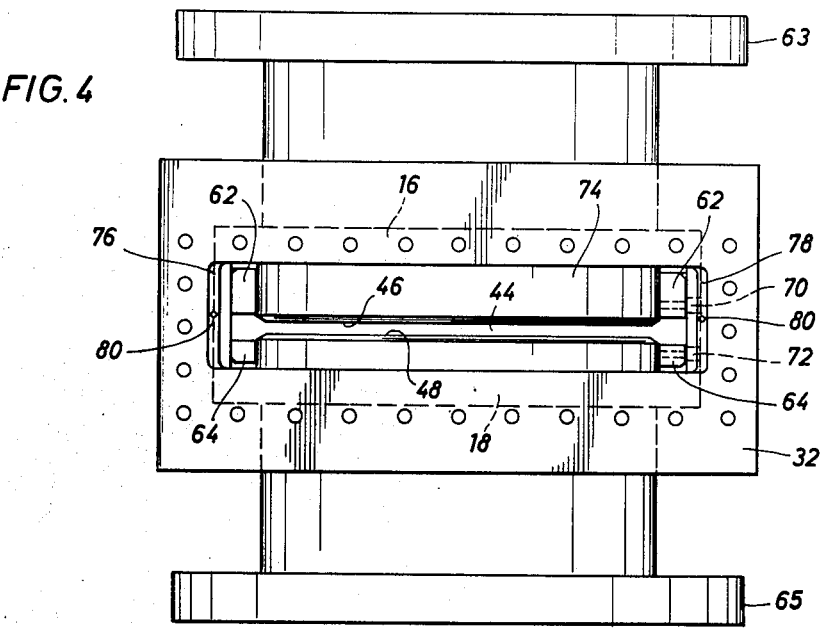

FIG. 4 is a view taken along line 4—4 of FIG. 3 with the valve carrier mechanism retracted to the open position thereof.

Figure 5A:
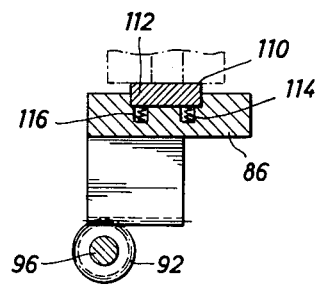
Figure 5:
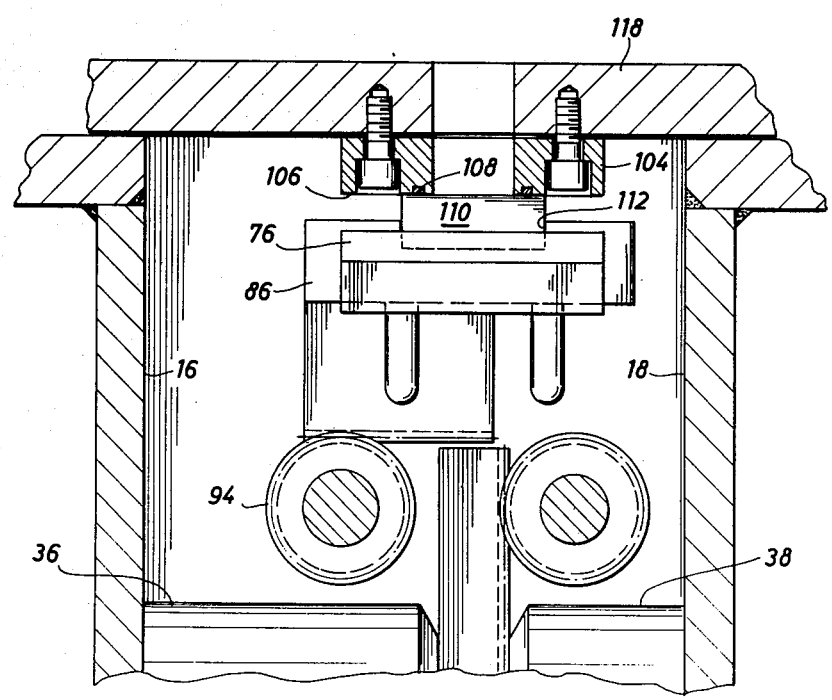

FIG. 5 is a fragmentary sectional view of the upper central portion of the lower body section illustrating the valve, valve seat and seat support structure in detail.

FIG. 5a is a fragmentary view of the upper portion of the lower body section illustrating the structure of the valve carrier structure in detail.

Figure 6:
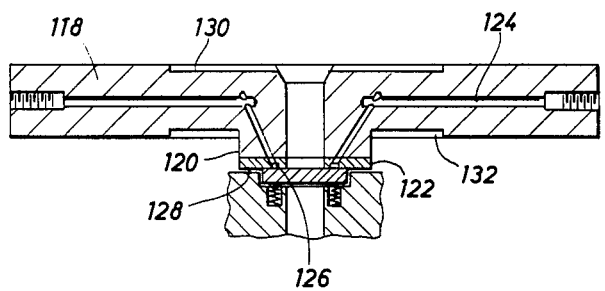

FIG. 6 is a transverse sectional view of an integral valve seat and support plate structure representing an alternative embodiment of the invention and showing a valve strip being urged into engagement with the seat by compression spring elements.

Figure 7:
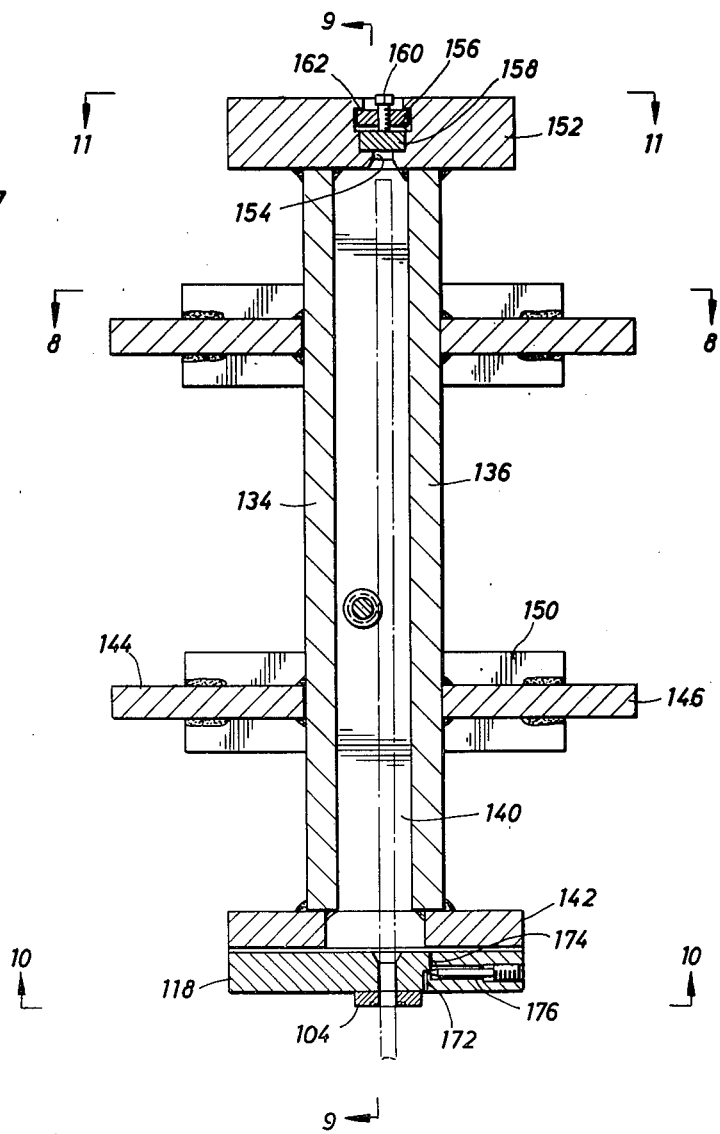

FIG. 7 is a sectional view taken through the upper body section of the orifice fitting mechanism and illustrating a seat mounting plate structure positioned at the lower extremity of the upper body section.

Figure 8:
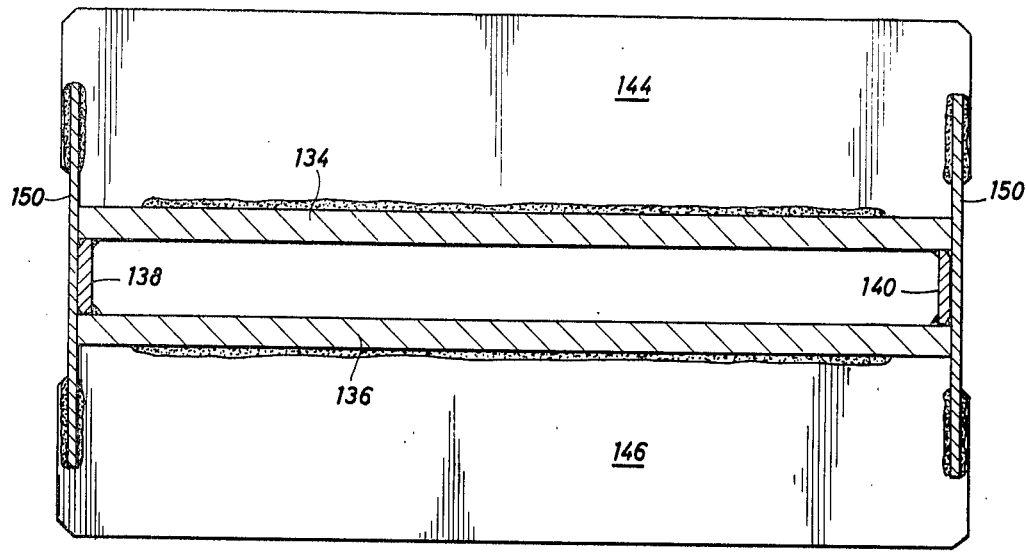

FIG. 8 is a transverse sectional view taken along line 8—8 of FIG. 7 and illustrating the rib and tie plate structure in detail.

Figure 9:
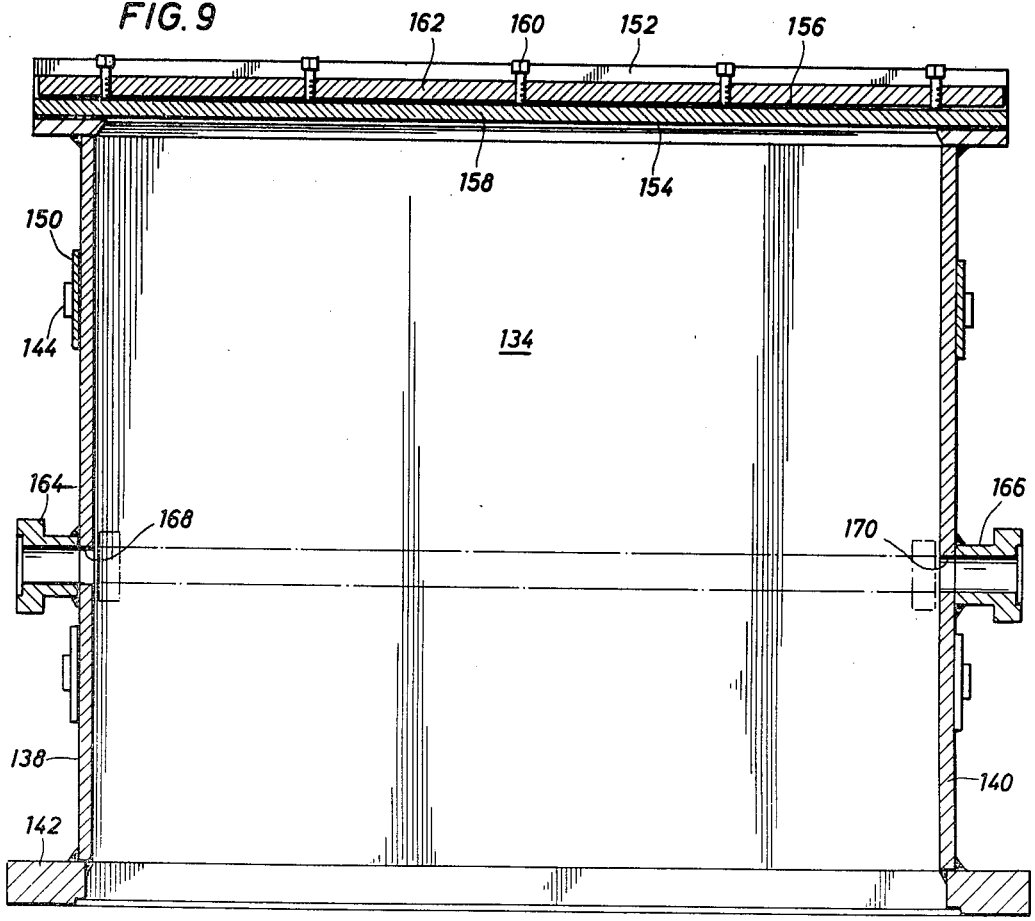

FIG. 9 is a sectional view taken along line 9—9 of FIG. 7 and illustrating the detailed construction of the upper body section.

FIG. 10 is a plan view illustrating the seat carrier plate of FIG. 7.

FIG. 11 is a plan view of the upper closure plate structure of FIG. 7 illustrating the provision of a narrow groove for entry and exit of the orifice plate carrier structure.

FIG. 12 is a fragmentary sectional view of an alternate embodiment of the invention illustrating a packing gland and conduit pressure tap passage construction.

DETAILED DESCRIPTION OF PREFERRED EMBODIMENT

Referring now to the drawings, and first to FIG. 1, a fabricated orifice fitting structure is illustrated generally at 10, which structure is defined by upper and lower body sections illustrated generally at 12 and 14, respectively.

The lower body section, which is best illustrated in FIG. 2, incorporates a pair of generally parallel end plates 16 and 18 that are of generally rectangular outer configuration and define circular internal openings 20 and 22 that cooperate with other structural components of the lower body section to define a smooth, high finished, cylindrical flow passage 24 extending through the lower body section of the orifice fitting. A pair of side plates 26 and 28 are connected to the end plates 16 and 18 by internal and external welds and cooperate with the end plates to define a generally rectangular body tube structure. The body tube is closed by means of a bottom plate 30 that is connected to the end plate and side plates by internal and external fillet welds. An upper connection flange 32 is also secured to the end plate and side plates of the body tube structure by means of internal and external fillet welds and defines a relatively large access opening 34 through which access may be gained to the interior portions of the body tube structure for the purpose of forming certain ones of the internal fillet welds. Where high pressure service is a design consideration, it is quite necessary to provide both internal and external weld connections at each joint between the various metal plates to prevent pressure induced deflection of the plates from causing weld connections to yield or rupture. If welds are only provided externally of the body tube configuration, outward deflection of the metal plate structure by the forces induced by internal pressure can cause pivotal yielding of the external welds. In these cases, the external weld functions as a fulcrum or pivot point about which the plate structure is caused to rotate by pressure induced deflection. The internal welds provided in the present construction prevent pivotal plate rotation about the external welds and thereby effectively promote the development of pressure containing body structures that are well adapted to high pressure conditions.

A most important aspect of the invention concerns the provision of separate internal hub rings 36 and 38 that may be welded into the body structure after the basic rectangular pressure containing structure has been developed. The hub rings 36 and 38 are formed to define chamfers 40 and 42 that cooperate with annular tapered surfaces 44 and 46 defined by the end plates 16 and 18 to provide an appropriate weld groove for the establishment of a full penetration weld between the respective hub rings and the end plates. When in assembly with the end plate structure, the hub rings 36 and 38 cooperate to define a narrow air space 44 through which an orifice carrier may pass for positioning an orifice plate in registry with the flow passage 24. The circular hub rings may be very accurately positioned within the body structure prior to welding, thus making it practical to define extremely true and properly spaced opposed sealing surfaces 46 and 48 that are engaged by an annular sealing element provided on the orifice carrier structure. It is necessary that the annular sealing surfaces 46 and 48 be parallel within quite close tolerances and also closely spaced within minimum tolerances as well as being true for optimum sealing contact with the elastomeric sealing element of the orifice carrier. Since the hub rings may be very accurately positioned prior to the welding operation, only light machining cuts will be necessary to bring the opposed sealing surfaces 46 and 48 of the hubs within properly spaced tolerances. Because the air space 44 is quite narrow, obviously the cutting tools that are utilized for surface preparation of the annular sealing surfaces 46 and 48 must be relatively small. With light weight machining devices, it is necessary that minimum machining cuts be taken in order that the cutting tools will not yield to the extent that untrue machined sealing surfaces are developed. Machining time for preparation of the sealing surfaces 46 and 48 can be maintained at a minimum since the opposed faces of the hubs 36 and 38 can be accurately positioned relative to one another. Obviously, in casting operations it is not possible to maintain extremely close tolerances where narrow gaps are developed between such structural components inside of quite heavy external components. The welded hub structures of the present invention reduce the machining time for hub preparation by a considerable extent, and, yet, provide the capability for efficient machining of the opposed sealing surfaces by simple low-cost machining operations. Moreover, through employment of the wrought metal hubs in the fabricated manufacturing operation, it is not necessary to consider weld repair of the machined sealing surfaces because of sand inclusion as is the case with respect to cast body structures.

As mentioned above, where high pressure service is intended, it is necessary to provide both internal and external weld connections between the various plate structures of the generally rectangular pressure containing portion of the orifice body structure. Prior to assembly of the hub rings into the body structure, the internal welds can be very simply formed by extending welding booms through the access opening 34. Subsequent to formation of the internal welds, the hub rings can be accurately positioned within the lower body structure and welded in place.

The lower body structure 14 of the orifice fitting is completed to a large extent by welding a pair of conduit sections 50 and 52 to the outer portion of the end plates 16 and 18, respectively, with the internal cylindrical surfaces 54 and 56 of the conduit sections positioned in registry with the internal openings 20 and 22 of the end plates and also in registry with cylindrical surfaces 58 and 60 defining the internal circumference of the hub rings 36 and 38. In practice, the internal cylindrical surfaces defined by the conduit sections, hub rings and end plate openings are machined to an accurate high surface finish as a final machining operation, thus defining the flow passage 24 through the orifice fitting as an accurate and extremely smooth through-bore for enhancement of the accuracy of the pressure differential measurement that is detected immediately upstream and downstream of the orifice plate.

The lower body structure of the orifice fitting is adapted for connection to a pipeline structure by any suitable conventional connection means. As shown in FIG. 2, connection flanges 63 and 65 are welded to the conduit sections 50 and 52, thus providing for bolted connection of the orifice fitting structure between connection flanges of a pipeline system. Obviously, any other suitable form of connection system, such as a welded connection preparation, may be employed within the spirit and scope of the present invention.

Referring now particularly to FIG. 3, each of the circular hub rings 36 and 38 is formed to define external bosses 62 and 64 that are positioned in juxtaposed relation with the side plate structures 26 and 28 with the hub rings properly positioned within the lower body structure. The side plate is formed to define an opening 66 that is of slightly smaller dimension that the dimension of the boss positioned at the opening. Weld metal 68 is deposited within the opening 66 to establish a welded connection between the bosses and the side plate structure. Pressure tap passages 70 and 72 are formed through the weld metal and boss structure and terminate at the internal surfaces 58 and 60 of the hub rings. Thus, a sealed connection is established between the flow passage 24 of the orifice fitting and the external wall defined by the side plates 26 and 28. The outer portions of each of the pressure tap passages are internally threaded, or otherwise appropriately prepared, for connection with a pressure transmitting conduit, not shown, that transmits the detected pressure to appropriate instrumentation for flow measurement processing.

Referring also particularly with respect to FIGS. 3 and 4, the upper connection flange 32 defines an internal recess 74 within which is positioned a pair of valve guide elements 76 and 78 that are retained by means of bolts 80. Each of the valve guide elements is formed to define an elongated recess 82 which receives a guide flange 84 defined on a movable valve carrier 86. The valve carrier is formed to define opposed elongated bosses defining rack elements 88 and 90 that are engaged by pinion gears 92 and 94 supported by a rotatable gear drive shaft 96. Packing gland structures 98 and 100 are connected to the side plate structure of the lower body section and provides sealed passages through which the gear drive shaft 96 extends. A free extremity 102 of the gear drive shaft 96 may be provided with a crank, or any other suitable operative device, in order to allow manual rotation of the gear drive shaft.

As the gear drive shaft is rotated, the rotating pinion gears 92 and 94 of the shaft react with the rack elements 88 and 90, thus causing the valve carrier 86 to shift laterally within the lower body section. This lateral shifting exposing the air space 44 defined between the sealing surfaces 46 and 48, thus allowing the orifice carrier element to be inserted into or removed from the air space. As shown in the fragmentary section of FIG. 5, an elongated valve seat 104 is positioned slightly into the upper extremity of the lower body section and defines a substantially planar sealing surface 106 having a lubricant groove 108 formed therein. A valve strip element 110 is received within a recess 112 defined in the valve carrier 86. As shown in FIG. 5a, compression spring members 114 retained within spring recesses 116 bear against the lower portion of the strip valve 110 thereby serving to urge the strip valve upwardly into proper seating engagement with the seat structure 104.

With reference now to FIG. 6, a seat support plate, which is generally illustrated at 118, is designed to be interposed between the upper and lower body sections of the orifice fitting structure. As shown, the seat support plate may define an integral seat boss 120 to which may be applied an overlay 122 formed by any suitable wear resistant seat material. Sealant passages may be formed in the seat support plate structure and may communicate with sealant grooves 126 defined at the sealing surface 128 of the seat. The seat support plate may be relieved, as shown at 130 and 132, thereby providing annular seal grooves capable of receiving an elastomeric seal element, such as an O-ring or the like, for the establishment of a fluid tight seal with both of the upper and lower body sections.

FIGS. 7 and 8 of the drawings are sectional views illustrating an upper body section constructed in accordance with the principles of the present invention. The upper body section incorporates a pair of end plates 134 and 136 that are positioned in generally parallel relation and are connected to opposed pairs of side plates 138 and 140 which are illustrated in FIG. 9. The side plates 138 and 140 are connected to the end plates by means of internal and external welds in the manner discussed above in connection with the lower body section of the orifice fitting structure. At the lower portion of the upper body section is provided a connection flange 142 that is welded to the side plates and end plates by means of internal and external welds. The seat support plate 118 illustrated in FIG. 6 is shown to be positioned in engagement with the lower surface of the connection flange 142.

The upper body section of the orifice fitting structure is defined by rib and tie plate structure which is evident from FIGS. 7 and 8. Each of the rib and tie plate structures incorporates a pair of rib members 144 and 146 having the inner portions thereof welded to respective ones of the end plates 134 and 136. The connection welds between the ribs and the end plates extends just short of the entire length of the ribs. The rib elements are cut away at the inner portions thereof to provide relief adjacent the corner structures of the body tube that is defined between the side plates and end plates. A pair of tie plate elements 148 and 150 extend across the side plates 138 and 140 and are formed to define recesses at the extremities thereof that receive the extremities of the rib members 144 and 146.

The upper portion of the upper housing section is defined by a closure plate 152 that is also connected to the end plates and side plates of the body structure by means of internal and external welds. The closure plate 152 is formed to define an elongated opening 154 through which the orifice carrier element may pass as it moves outwardly of the orifice fitting structure for inspection or replacement. An elongated closure receptacle 156 is defined by an elongated undercut slot and a closure element is receivable within the closure receptacle and is operable to establish a fluid tight seal to prevent any leakage from the orifice fitting body structure. The closure mechanism comprises a closure plate that is maintained in position by means of jacking screws 160 that extend through a locking plate 162.

For the purpose of raising and lowering the orifice plate carrier, packing receptacles 164 and 166 are welded to the side wall structure of the upper body section about shaft openings 168 and 170. An elongated pinion gear drive shaft substantially identical to the gear drive shaft shown at 96 in FIG. 2 will extend through the shaft openings 168 and 170 to support pinion gears that engage a pair of rack structures that are defined on the orifice plate carrier.

It should be borne in mind that the upper body section, like the lower body section, is formed within an enlarged entry opening, thereby allowing a welding boom structure to be inserted into the tubular body structure for the purpose of forming fillet welds at the internal juncture between the side plates, end plates, closure plate and connection flange. The upper body section is therefore also effectively designed for efficient operation in high pressure service.

As mentioned above, it is desirable to provide both of the upper and lower body sections of an orifice fitting with relatively narrow elongated slot openings so as to allow the orifice plate carrier to be moved through the body sections for operation or inspection. Although the upper and lower body sections are formed to define relatively large openings for efficient welding access to the interior structure of the body sections, a narrow opening is defined between the upper and lower body sections by means of the intermediate seat support plate. In addition to providing proper support for the valve seat, the seat support plate is also formed to define pressure balancing passages 172 and 174 that are communicated by means of a balancing valve passage 176. A conventional needle valve mechanism is received within the valve passage 176 and, in the closed position thereof, prevents communication between the pressure balancing passages 172 and 174. The valve mechanism is opened to allow communication between the passages 172 and 174, thereby allowing the internal chambers of the upper and lower body sections to become equalized.

As shown in FIG. 12, the tap passage connection may be established as a tube and packing gland arrangement. To the side wall 178 is welded a circular collar 180 and the internal wall of the collar and a portion of the side wall are formed to define an internally threaded packing chamber 182 receiving a packing 184. A packing retainer element 186 is threaded into the collar and serves to retain the packing in position. A pressure tap tube 188 extends through a bore 190 defined in the packing retainer and extends through an opening 192 in the side wall. The tube 188 is connected by any suitable means to a boss 194 defined on a hub ring 196. The outer extremity of the pressure tap tube is internally threaded for connection thereof to conduit means transmitting the pressure signal to a signal processing system.

In view of the foregoing, it is evident that the present invention provides a novel method of manufacturing a fabricated orifice fitting structure with the basic pressure containing structural components thereof interconnected by means of both inner and outer welds for the capability of high pressure service. In the lower body section, the provision of internal hub rings that are welded to end plate structures promote the ability to establish internal and external welds for the pressure containing tubular structure of the lower housing section and yet provide a narrow air space between the hub elements through which the orifice plate carrier may be moved. Without utilization of the inner hub ring elements, it would be difficult, if not impossible, to establish internal welds at certain portions of the lower housing section. The result would be a housing structure that must be otherwise strengthened for the purpose of high pressure service. The present invention also provides a unique system for developing low cost orifice fitting structures that are composed of readily available material and may be manufactured and delivered within a reasonably short period of time. This establishes a commercial advantage that is not generally available when cast products are specially designed to meet particular customer requirements. The present invention lends the manufacture of orifice fitting structures under circumstances where foundry operations are not readily available. The invention provides an orifice fitting mechanism that is easily machined without the typical difficulties that are attendant to large products of this type manufactured from cast material.

In view of the foregoing, it is clearly evident that the present invention is one well adapted to attain all of the objects and advantages hereinabove set forth, together with other objects and advantages that are inherent from a description of the apparatus itself.

It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. A method of fabricating an orifice fitting structure including restricted opening means for passage of an orifice plate carrier and having closely spaced internal hubs defining opposed sealing surfaces for engagement by the sealing element of the orifice plate carrier and wherein internal and external welds between the various structural components are necessary for high pressure service conditions, said method comprising:

forming a basic pressure containing orifice fitting body structure by connecting a plurality of generally rectangular body plates by means of external weld connections, said body structure defining a rectangular access opening and opposed openings through which fluid flows;

extending welding apparatus through said access opening and forming internal weld connections between said body plates;

locating internal hub rings within said body structure in such manner as to position opposed end faces of said hub rings in parallel closely spaced relation and to position inner portions of said hubs about said opposed openings for welded connection to selected ones of said body plates;

extending welding apparatus through said opposed openings and forming welds between the selected body plates and hub rings;

positioning conduit sections in assembly with selected ones of said body plates defining intersection therebetween and in registry with said opposed openings;

extending welding apparatus through said conduit sections and connecting said conduit sections to the external portion of said selected body plates by means of internal welds; and making external welds at the intersection of said conduit sections and body plates.

2. A method as recited in claim 1, wherein:

said welds between said hub rings and selected body plates are full penetration welds.

3. A method as recited in claim 1, wherein said method includes:
establishing a welded connection between one of said body plates and said hub rings; and
forming pressure tap passages through said weld connection and said hub rings.

4. A method as recited in claim 1, wherein said orifice fitting body structure includes upper and lower body sections having connection flanges for interconnection thereof and said method includes:
locating restriction means between said connection flanges; and
securing said connection flanges and said restriction means in assembly by bolting.

* * * * *